Nov. 22, 1927. 1,650,453
J. W. KREBS
BUCK RAKE
Filed May 18, 1926 2 Sheets-Sheet 1

INVENTOR.
John W. Krebs
BY
Geo. P. Kimmel ATTORNEY.

Nov. 22, 1927.
J. W. KREBS
1,650,453
BUCK RAKE
Filed May 18, 1926
2 Sheets-Sheet 2
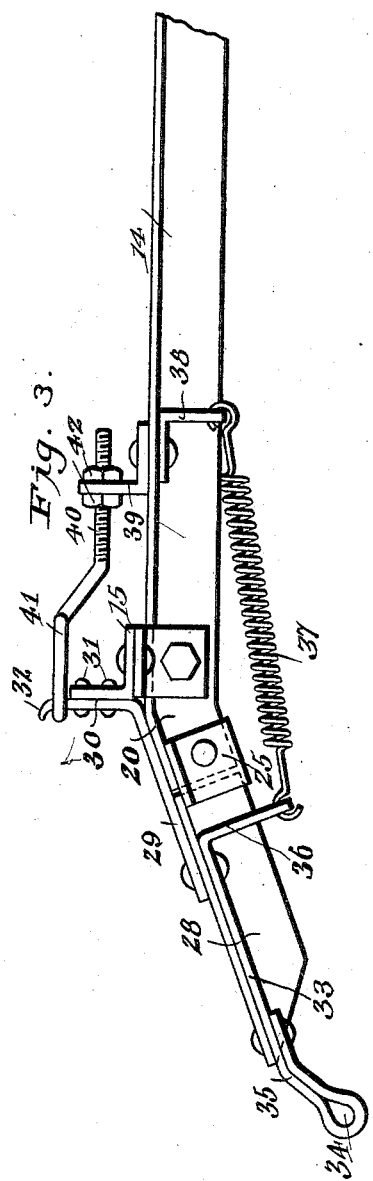
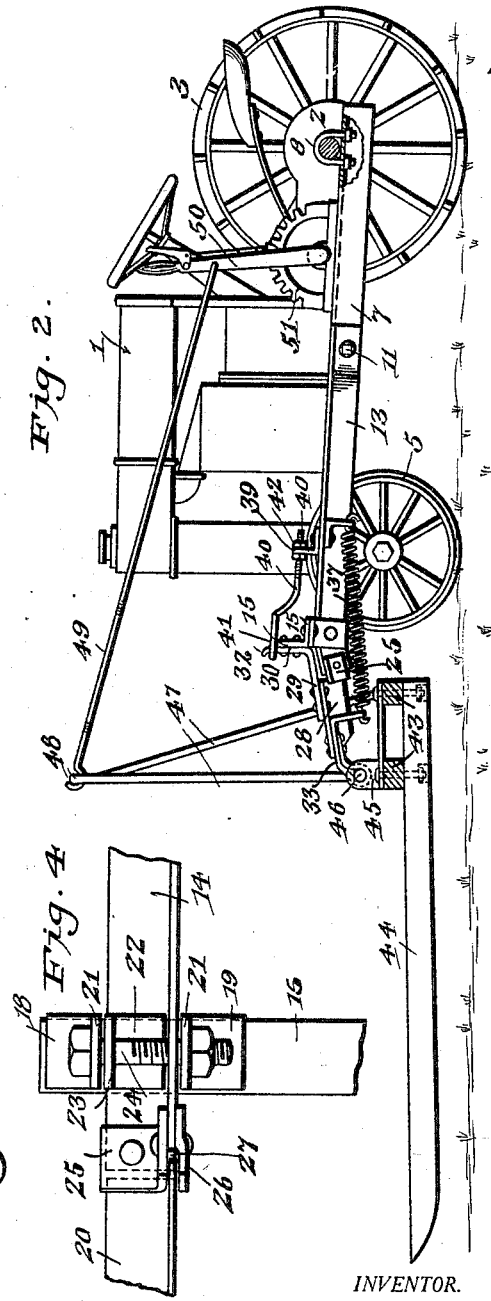
INVENTOR.
John W. Krebs
BY
Geo. P. Kimmel ATTORNEY.

Patented Nov. 22, 1927.

1,650,453

UNITED STATES PATENT OFFICE.

JOHN W. KREBS, OF GOODYEAR, ARIZONA.

BUCK RAKE.

Application filed May 13, 1926. Serial No. 109,972.

This invention relates to harvesting devices and pertains particularly to a raking device known as a buck rake.

The primary object of this invention is the provision, in a manner as hereinafter set forth, of a supporting structure for a buckrake, so designed that when the rake is mounted upon the front of a tractor, all danger of damage to the rake in event that the forward part of the tractor should drop into a hole or ditch, will be prevented by upwardly swinging members from which the rake is carried.

Another object of the invention is the provision, in a manner as hereinafter set forth, of a buckrake and structure for supporting the same before and from a tractor, having means whereby the rake may be adjustably held with respect to the ground over which it is to travel.

A further and final object of the invention is the provision, in a manner as hereinafter set forth, of a buckrake supporting structure of simple but strong and durable construction, of a style adapted to be easily and quickly mounted upon a tractor, and comparatively inexpensive to manufacture.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:—

Figure 2 shows in side elevation, the structure shown in Figure 1.

Figure 3 is an enlarged detailed side elevation of the hinged forward portion of the rake supporting structure and, Figure 4 is an underside view of the central portion of the structure shown in Figure 3, the spring therefrom being removed.

Figure 1:
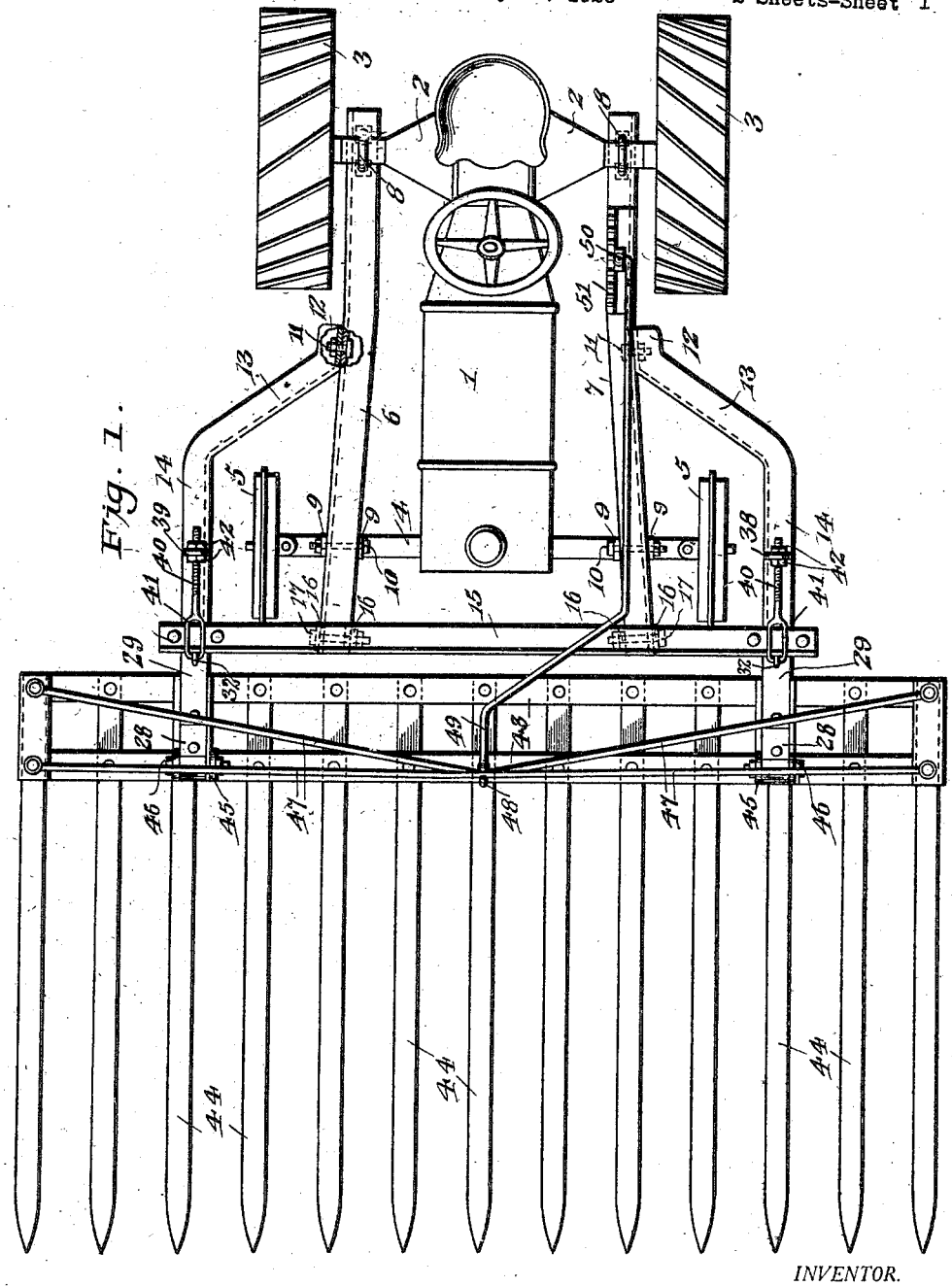
Figure 1 shows in top plan, a tractor, and the buckrake and buckrake supporting structure embodying this invention, mounted upon the tractor.

Referring now to the drawings in detail wherein like numerals of reference indicate corresponding parts throughout the several views, there is indicated generally by the numeral 1 a tractor having the usual rear axle housing 2 carrying the rear main tractor wheels 3, and the forward axle 4 carrying the forward guide wheels 5.

The buckrake supporting frame embodying this invention, and designed to be mounted upon a tractor, comprises a pair of substantially parallel beams 6 and 7 adapted to be positioned one on each side of the tractor body and each of the beams has at its rear end a U-bolt 8, which overlies the rear axle housing 2, while the rear end of the beam extends beneath the housing.

The forward end of each of the beams 6 and 7 extends over the front axle 4 and a substantial distance therebeyond, terminating a slight distance in front of the wheels 5. Each of these beams 6 and 7 is mounted between and secured to upstanding ears 9, by means of the bolts 10, these ears being mounted upon the top of the axle 4 as shown in Figure 1.

Connected intermediate the ends of each of the beams 6 and 7, by means of the bolts 11, is one angled end 12 of an obtusely angled portion 13 of an arm 14. The portions 13 of each of the arms 14, extend outwardly and forwardly from the respective beam 6 or 7, and the arm 14 proper is thus positioned upon the outer side of the adjacent front wheel 5 and extends a substantial distance beyond the same as is clearly shown in Figure 1.

Extending across the forward ends of the beams 6 and 7 is a transverse supporting beam 15 which carries upon its underface downwardly extending spaced ears 16 similar to the ears 9 mounted upon the axle 4. Between these downwardly extending ears 16 the forward ends of the beams 6 and 7 extend and are secured thereto by means of the bolts 17.

At each end of the transverse supporting beam 15 there is secured in spaced relation, a pair of angle brackets 18 and 19, the brackets 18 being those adjacent the outer end of the beam while the brackets 19 are of course those inwardly of the end of the beam. These brackets are clearly shown in Figure 4.

The forward end of each of the side arms 14 is bent slightly downwardly as indicated at 20 and each of the arms 14 passes between the downwardly extending portions 21 of the brackets 18 and 19, at a point just to the rear of this downturned portion 20. The arm 14 as shown, is of L-shaped construction and has secured to the underside thereof a bracket member 22 having the downwardly extending portion 23 thereof projecting from that edge of the arm opposite the downwardly extending portion of the arm. A downwardly extending flanged section is thus formed opposite the other side flange, and this flanged section and the flange proper of the arm is arranged between the portions 21 of the brackets 18 and 19 as above described. A securing and pivot bolt 24 is passed through the portions 21 of the brackets 18 and 19 and through the portion 23 of the bracket 22 and the downwardly extending flange of the arm, thus pivotally securing the cross supporting beam 15 at its end to the adjacent forwardly extending arms 14 just rearwardly of their downturned portions 20. The connections between the bolts 17 and the ears 16 carried upon the underside of the supporting beam 15, are also adapted for movement upon the beams 16, and it will thus be seen that the supporting beam 15 is mounted to swing about its longitudinal axis.

Secured in the angle of the downturned portion 20 of each of the arms 14, is an angle bracket 25, the forward edge of each web thereof being extended slightly beyond the end of the portion 20 of the arm, as shown clearly in Figures 3 and 4. Upon the opposite side of the downwardly extending web of each of the portions 20, there is secured a plate 26 the forward edge of which also extends beyond the forward edge of the portion 20 to which it is attached, as is clearly shown in Figure 4 thus setting up a slot at the outer end of each of the portions 20.

Positioned in end abutting relation to each of the portions 20 of each arm 14, is an arm extension portion 28 formed of L-shaped material like the arms 14, and a downwardly extending web of each of these extension portions is adapted to fit in the slot 27 as shown in Figures 3 and 4. Secured upon the top web of each of the arm extension portions 28 is the leg 29 of an abutment member 30, the member 30 forming an obtuse angle with the leg 29 and adapted to be arranged in vertical position against the forward face of the cross supporting beam 15, when the arm extension portions 28 are in direct alignment with the downturned end portions 20 of the adjacent arm 14, as shown in Figure 3. As shown in Figure 3, the leg 29 of the abutment member 30 extends beyond the rear end of the arm extension, and lies upon the flat top of the adjacent angled portion 20. These abutment members are securely fastened by the rivets 31 to the upright portion of the beam 15, and the abutment member is extended a slight distance above the beam 15 and formed into a forwardly curving finger 32, for the purpose to be hereinafter set forth.

Extended beneath the underside of the top web of each arm extension member 28 is a supporting strap 33 having the forward end thereof turned back upon itself to set up the eye 34 which turned back forward portion is extended downwardly at an angle as indicated at 35 and projects beyond the forward end of its attached arm extension member. The rear end of the strap 33 is turned downwardly at right angles to the underside of the arm extension web 28, as indicated at 36. Engaged through an aperture in the free end of the downturned portion 36 is one end of a tension spring 37, the other end of which is engaged through an aperture in the downturned leg of the bracket member 38 which is secured against the underside of the top web of the adjacent arm 14, a substantial distance rearwardly of the forward end thereof as shown.

Secured above the bracket 38 upon each of the arms 14, is an upstanding bracket 39 having an aperture therethrough to receive the threaded shank 40 of a horizontally arranged elongated eye or loop 41, which eye extends forwardly over the top of the beam 15 and has the finger 32 of the abutment member 30 extended therethrough. Securing and adjusting nuts 42 are threaded upon the threaded shank 40 and hold the eye member 41 in adjusted position. It will be readily seen that when the eye member 41 is drawn rearwardly the arm extension member 28 will be prevented from swinging downwardly to the position parallel with the portion 20 of the arm 14, as shown in present Figure 3 and by manipulation of the adjusting nuts 42 the eye member 41 can be arranged to control the swing of the arm extension portion 28, as desired.

Arranged beneath the arm extension portions 20 of the rake supporting structure is a pair of transversely extending parallel beams 43 which carry secured to the undersides and transversely thereof the forwardly extending rake tines 44. One of the beams 43 as shown in Figure 1, extends across the ends of the tines while the other beam is positioned inwardly from the ends thereof. Upon this inwardly positioned beam there is secured two pair of spaced upwardly extending ears 45, each of which pair is adapted to receive therebetween an eye 34 of an arm extension portion 28. A pivot member 46 is extended through these eyes 34 and ears upon each side thereof to pivotally secure the rake structure upon the supporting frame.

Extending upwardly and inwardly from each end of each of the beams 43 are rod members 47 which are joined at the point 48 and engaging beneath this joined point of the rods 47 is a hook end of an actuating rod 49, the other end of which extends through a lever member 50 mounted to revolve about a rack 51 which is in turn mounted upon one of the beams 6 or 7.

It will be seen from the foregoing description that the buckrake is pivotally suspended at two points, first from the eye 34 carried upon the outer end of each of the arm extension members 28 and secondly from the transversely extending supporting beam 15 through the medium of the upright abutment member 30 which is jointed to the extension arm 28 and through the beam 15 as shown in Figure 3. It will thus be seen that the rake structure can be raised or lowered slightly in a perfectly horizontal position due to the double pivotal connection adjacent each end thereof, between it and its supporting structure. The position in which the rake is shown in Figure 2 is slightly raised as it is shown that the arm extension member 28 is out of alignment with the downturned portion 20 of the side supporting arm and this extension member is adapted to be moved downwardly to a position in alignment with the downturned portion 20 of the supporting arm, as shown in Figure 3. It will also be seen that in using this rake, should the front wheels 5 of the tractor rake, drop into a hole or a ditch causing the rake to come in contact with the earth, no damage would result as the arm extension members 14 would swing upwardly and relieve some of the strain upon the rake and strain supporting structure.

Having thus described my invention what I claim is:—

1. A buckrake supporting structure of the character described, comprising a frame adapted to be mounted upon a supporting vehicle and including a pair of forwardly directed substantially parallel arms, a cross beam overlying and pivotally secured to said arms, a buckrake structure, an arm extension member projecting forwardly of each arm and pivotally supporting said buckrake structure, and resilient and pivotal securing means between each member and arm.

2. A buckrake supporting structure of the character described, comprising a frame adapted to be mounted upon a supporting vehicle and including a pair of forwardly directed arms, an arm extension member extending forwardly from the end of each arm, a pivotal connection between each arm and arm extension, and a buckrake positioned forwardly of and in a lower plane than said frame and having pivotal connection with the free end of each arm extension member.

3. A buckrake supporting structure of the character described, comprising a frame adapted to be mounted upon a supporting vehicle and including a pair of forwardly directed arms, a beam member overlying said arms inwardly of the forward ends thereof, a pivotal connection between said beam and said arms, an arm extension member extending in alignment with and from each arm, an upstanding member carried by each arm extension, means pivotally and adjustably connecting the upstanding member to the adjacent arm of the frame, a buckrake having the rear portion positioned beneath said arm extension members, and pivotal connections between said buckrake and the free end of each arm extension.

4. A buckrake supporting structure of the character described, comprising a frame adapted to be mounted upon a supporting vehicle and including a pair of forwardly directed arms, a beam member overlying said arms inwardly of the forward ends thereof, a pivotal connection between said beam and said arms, an arm extension member extending in alignment with and from each arm, an upstanding member carried by each arm extension member, pivotal connecting means between said buckrake and the free end of the arm extension members, and adjustable means carried upon each arm and linked with the upstanding member on each adjacent arm extension member for limiting the movement of the said arm extension member in one direction.

5. A buckrake supporting structure of the character described, comprising a frame adapted to be mounted upon a supporting vehicle and including a pair of forwardly directed arms, a beam member overlying said arms inwardly of the forward ends thereof, a pivotal connection between said beam and said arms, an arm extension member extending in alignment with and from each arm, an upstanding member carried by each arm extension member, pivotal connecting means between said buckrake and the free end of the arm extension members, adjustable means carried upon each arm and linked with the upstanding member on each adjacent arm extension member for limiting the movement of the said arm extension member in one direction, and a resilient connection between each arm extension member and each arm of the frame.

6. A buckrake supporting structure of the character described, comprising a plurality of beams, a pair of the latter being adapted for coupling with the rear axle housing and front axle of a motor propelled tractor, the remaining beams being forwardly inclined at their front ends, a cross sill united to all of the beams forwardly of said tractor, extension arms engaged with the last named front ends, resilient means acting to sustain the extension arms engaged with said front ends, adjustable means for detachably and pivotally coupling the extension arms to the said front ends, a buckrake pivotally supported by the extension arms, and means for raising and lowering the buckrake relative to a ground surface.

In testimony whereof, I affix my signature hereto.

JOHN W. KREBS.